(12) United States Patent
Lu

(10) Patent No.: US 10,145,628 B2
(45) Date of Patent: Dec. 4, 2018

(54) HEAT DISSIPATION DEVICE AND PORTABLE ELECTRONIC DEVICE

(71) Applicant: DELTA ELECTRONICS, INC., Taoyuan (TW)

(72) Inventor: Chao-Wen Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/094,266

(22) Filed: Apr. 8, 2016

(65) Prior Publication Data
US 2017/0156236 A1 Jun. 1, 2017

(30) Foreign Application Priority Data
Nov. 27, 2015 (TW) .............................. 104219083 U

(51) Int. Cl.
| H05K 7/20 | (2006.01) |
| F28F 13/06 | (2006.01) |
| F28D 15/00 | (2006.01) |
| F28F 9/00 | (2006.01) |
| F28F 3/08 | (2006.01) |
| G06F 1/20 | (2006.01) |
| F28D 21/00 | (2006.01) |

(52) U.S. Cl.
CPC .............. *F28F 13/06* (2013.01); *F28D 15/00* (2013.01); *F28F 3/086* (2013.01); *F28F 9/001* (2013.01); *F28F 9/005* (2013.01); *G06F 1/203* (2013.01); *F28D 2021/0028* (2013.01); *F28F 2250/08* (2013.01); *G06F 2200/201* (2013.01)

(58) Field of Classification Search
CPC .......................... F28F 2250/08; H05K 7/20136
USPC .................................. 361/695, 701, 702, 711
See application file for complete search history.

(56) References Cited

U.S. PATENT DOCUMENTS

| 7,055,581 B1* | 6/2006 | Roy ...................... H01L 23/427 165/104.21 |
| 7,222,661 B2* | 5/2007 | Wei ....................... H01L 23/467 165/104.33 |
| 7,971,632 B2* | 7/2011 | Eriksen ..................... G06F 1/20 165/104.31 |
| 2004/0240179 A1* | 12/2004 | Koga .................... H01L 23/473 361/699 |
| 2017/0027081 A1* | 1/2017 | Zhang ................ H05K 7/20272 |

* cited by examiner

*Primary Examiner* — Mukund G Patel
(74) *Attorney, Agent, or Firm* — Muncy, Geissler, Olds & Lowe, PC

(57) ABSTRACT

A heat dissipation device includes a first casing, a second casing, a thin pump, and a cooling member. The second casing is connected to the first casing to form a first accommodating space and a second accommodating space adjacent to and communicating with the first accommodating space. The thin pump is disposed in the first accommodating space. The cooling member is disposed in the second accommodating space and has a plurality of spacers, and the spacers and the thin pump are disposed on the same plane of the first casing. A portable electronic device having the heat dissipation device is also disclosed.

14 Claims, 6 Drawing Sheets

HEAT DISSIPATION DEVICE AND PORTABLE ELECTRONIC DEVICE

CROSS REFERENCE TO RELATED APPLICATIONS

This Non-provisional application claims priority under 35 U.S.C. § 119(a) on Patent Application No(s). 104219083 filed in Taiwan, Republic of China on Nov. 27, 2015, the entire contents of which are hereby incorporated by reference.

BACKGROUND OF THE INVENTION

Field of Invention

The invention relates to a heat dissipation device and a portable electronic device.

Related Art

Due to the rapid development of electronic products toward high-performance, high-frequency, high-speed and compact volume, the heat-generating temperature of each element in electronic products becomes higher and higher. Thus, unstable efficiency or damage to element easily occurs to affect product reliability. Therefore, heat dissipation devices are important to conventional electronic products.

A heat dissipation device used in an electronic device, for example a portable electronic device, is generally a fan with fins, a radiating pipe, a cooling module or the like. However, among these heat dissipation devices, it is not easy to thin the fan with fins and rotation noise is still a problem. Furthermore, because dust easily accumulates on fan blades or fins, the heat dissipation efficiency is accordingly reduced. Further, as to the radiating pipe or the cooling module, their internal capillary structures have plenty of design limitations, so it is not flexible to apply them to various heat emitting sources in the portable electronic device, and they cannot handle multiple heat emitting sources in their disposed positions either.

SUMMARY OF THE INVENTION

An aspect of the disclosure is to provide a heat dissipation device and a portable electronic device. The heat dissipation device according to the disclosure is thin, so it can be applied to the portable electronic device. Moreover, the heat dissipation device may be arranged flexibly with respect to the heat emitting source of the portable electronic device.

The heat dissipation device according to the disclosure includes a first casing, a second casing, a thin pump, and a cooling member. The second casing is connected to the first casing to form a first accommodating space and a second accommodating space adjacent to and communicating with the first accommodating space. The thin pump is disposed in the first accommodating space. The cooling member is disposed in the second accommodating space and has a plurality of spacers, and the spacers and the thin pump are disposed on the same plane of the first casing. A portable electronic device having the heat dissipation device is also disclosed. In one embodiment, the heat dissipation device is a liquid-cooling heat dissipation device. In one embodiment, the thickness of the thin pump is between 1 mm and 6 mm, the spacers are parallel arranged side by side on the first casing or the second casing, and the spacers and one of the first casing and the second casing are a single member.

In one embodiment, the heat dissipation device further includes a cover disposed on a portion of the first casing corresponding to the thin pump. In one embodiment, the cover may have a fluid inlet, and the fluid inlet communicates with the first accommodating space. Alternatively, the first casing or the second casing may have a fluid inlet, and the fluid inlet communicates with the first accommodating space.

In one embodiment, the first casing or the second casing further has a fluid outlet, at least one channel is formed by the spacers in the second accommodating space, and the channel communicates with the fluid outlet and the fluid inlet respectively.

Moreover, the portable electronic device according to the disclosure includes the heat dissipation device according to the above embodiments and a body. The body has a heat emitting source. The heat dissipation device contacts the body to take away the heat generated by the heat emitting source through itself.

As mentioned above, as to the heat dissipation device and the portable electronic device according to the disclosure, the thin pump and the cooling member are disposed on the same plane of the casing to thin the whole heat dissipation device for application of the portable electronic device. Moreover, the heat dissipation device has a compact volume, and it employs the cooling member disposed on the casing to contact the heat emitting source of the portable electronic device for heat dissipation. Therefore, the heat dissipation device may arranged flexibly for various heat emitting sources in the portable electronic device. Furthermore, the thin pump does not have the problems of noise and dust occurring in the fan-type heat dissipation device, but it has an improved dissipation capability in comparison with the air-cooling heat dissipation device.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements. Moreover, the drawings of all implementation are schematic, and they do not mean the actual size and proportion.

Figure 1A:
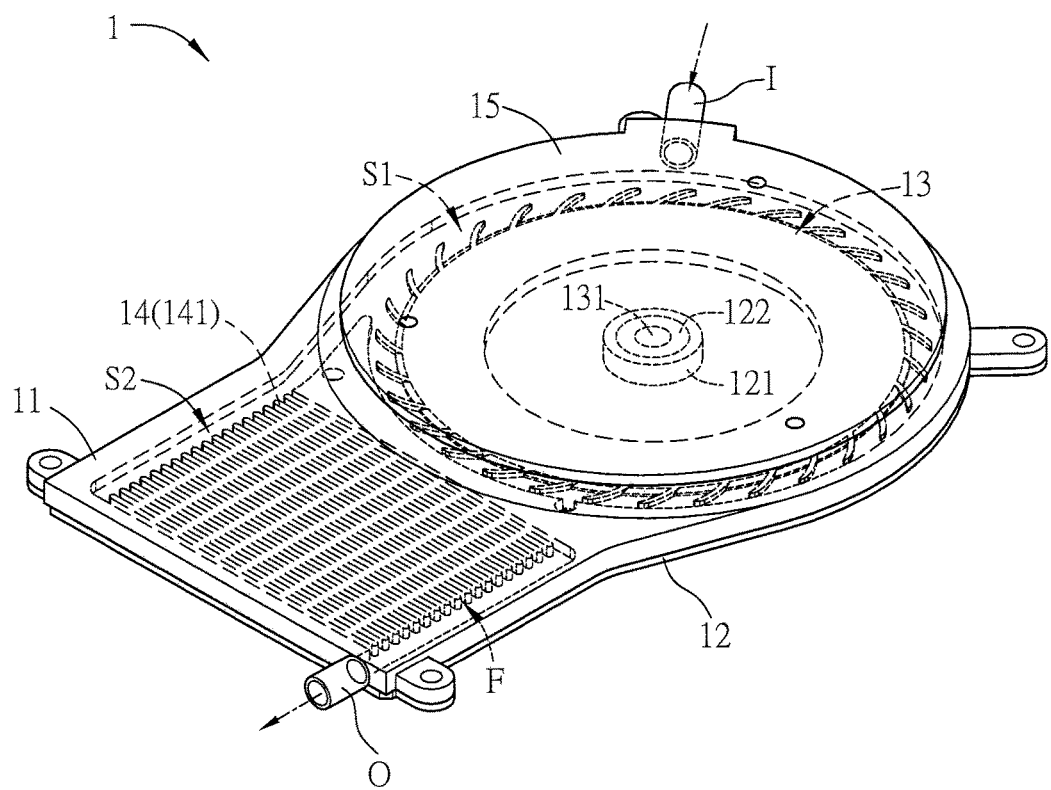
FIG. 1A and FIG. 1B are respectively a schematic assembly diagram and a schematic exploded diagram of a heat dissipation device according to a preferred embodiment.
Figure 1B:
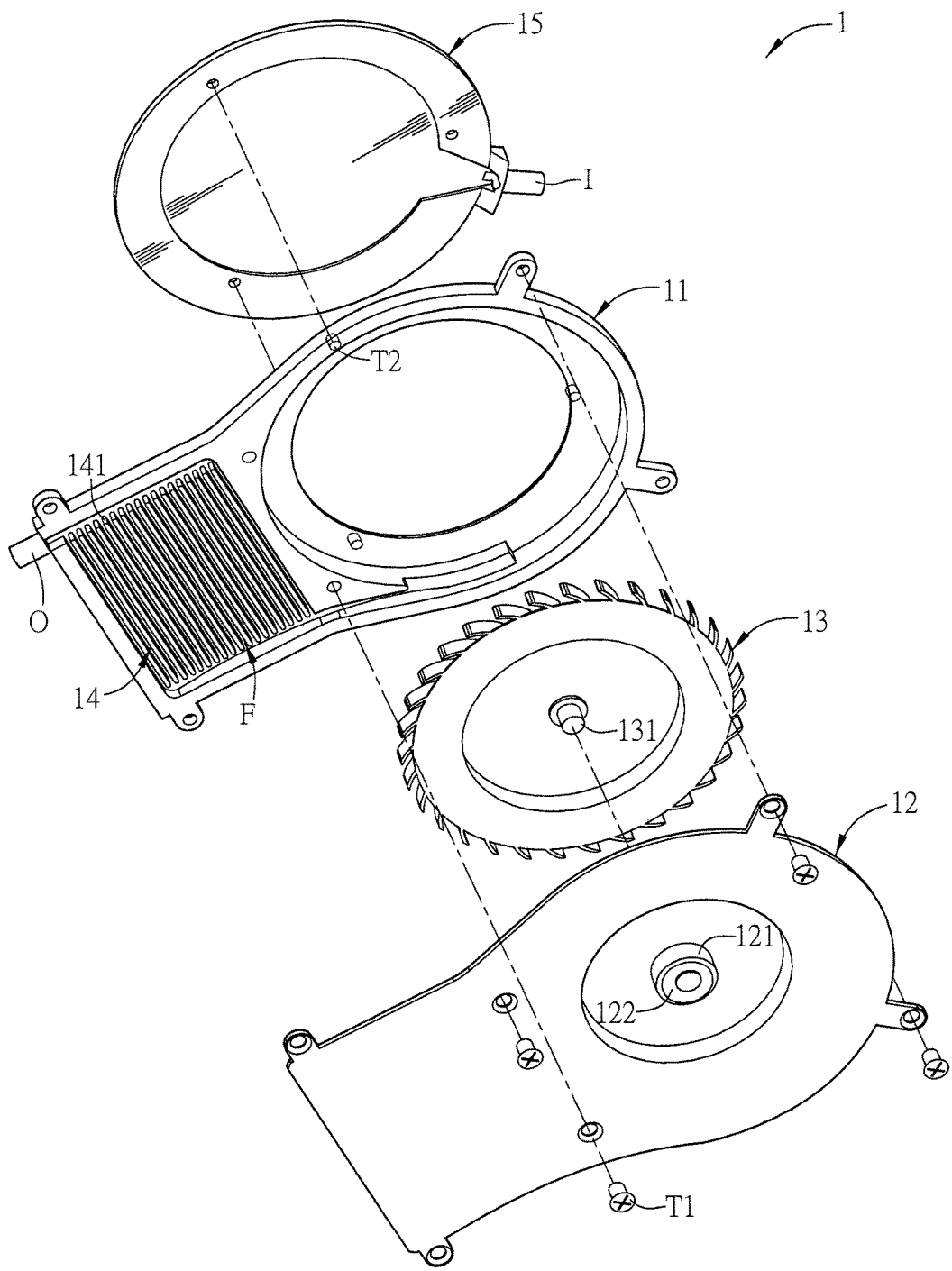
Figure 1C:
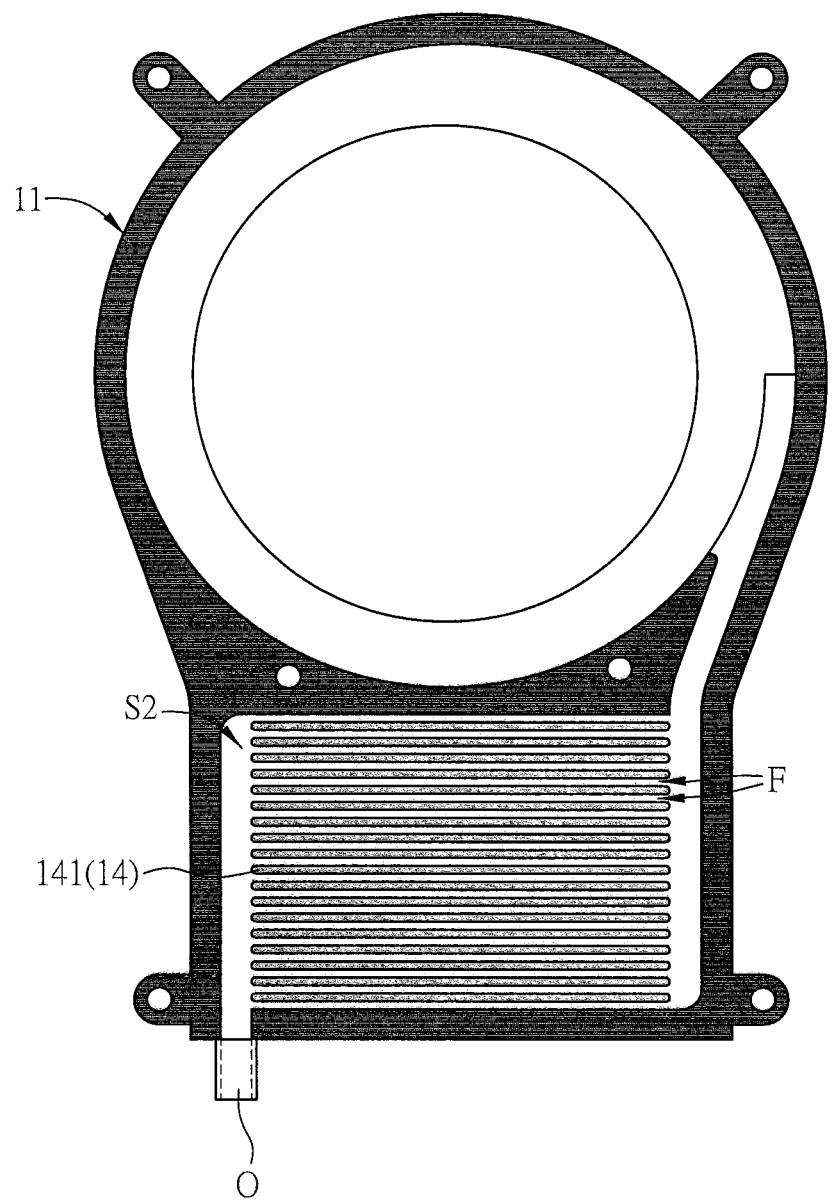
FIG. 1C is a schematic diagram showing the arrangement of the first casing and the cooling member of the heat dissipation device shown in FIG. 1A.

Referring to FIG. 1A to FIG. 1C, FIG. 1A and FIG. 1B are respectively a schematic assembly diagram and a schematic exploded diagram of a heat dissipation device 1 according to a preferred embodiment, and FIG. 1C is a schematic diagram showing the arrangement of the first casing 11 and the cooling member 14 of the heat dissipation device 1 shown in FIG. 1A.

The heat dissipation device 1 according to the disclosure is a liquid-cooling heat dissipation device, and it may be employed with a portable electronic device. The portable electronic device has at least a heat emitting source, and the heat dissipation device 1 may contact the heat emitting source of the portable electronic device to take away the heat generated by the heat emitting source, thereby reducing the temperature of the body of the portable electronic device. The heat dissipation device 1 includes a first casing 11, a second casing 12, a thin pump 13, and a cooling member 14. In addition, the heat dissipation device 1 according to the embodiment further includes a cover 15.

The first casing 11 is connected to the second casing 12 to form a first accommodating space S1 and a second accommodating space S2. The first accommodating space S1 and the second accommodating space S2 are adjacent to and communicate with each other. Here, the heat dissipation device 1 is a liquid-cooling heat dissipation device for example. A fluid (e.g. water) may flow into the first accommodating space S1 and then flow toward the second accommodating space S2 from the first accommodating space S1. As shown in FIG. 1B, in the embodiment, the first casing 11 and the second casing 12 are connected and fastened by for example but not limited to a plurality of screws T1 to form the first accommodating space S1 and the second accommodating space S2. The material of the first casing 11 and the second casing 12 may be a glass fiber, a plastic, a metal, an alloy, or a combination thereof, and it is not limited thereto.

The thin pump (also known as impeller) 13 is disposed in the first accommodating space S1 and connected to the first casing 11 or the second casing 12. In other words, the thin pump 13 is disposed in the first accommodating space S1 which is formed by connecting the first casing 11 and the second casing 12 to overlap the first casing 11 and the second casing 12. In the embodiment, a shaft center 131 of the thin pump 13 passes through a bearing 122 within a sleeve 121 disposed at the second casing 12 to be connected to the second casing 12, so that the thin pump 13 may be disposed in the first accommodating space S1. When a driving member (e.g. motor, not shown in the figures) drives the thin pump 13 to rotate, the fluid flowing into the first accommodating space S1 is pressurized and then driven to flow to the second accommodating space S2 from the first accommodating space S1. The thickness of the thin pump 13 may be between 1 mm and 6 mm. In one embodiment, the thickness of the thin pump 13 is, for example, 4 mm. Thus, the whole heat dissipation device 1 is thin and its cost is reduced.

Moreover, in the embodiment, the cover 15 is disposed on a portion of the first casing 11 corresponding to the thin pump 13, so the cover 15, the first casing 11 and the second casing 12 can form the first accommodating space S1 and the second accommodating space S2. Here, the cover 15 is fastened to the portion of the first casing 11 corresponding to the thin pump 13 by for example but not limited to a plurality of screws T2. Accordingly, when the heat dissipation device 1 is abnormal, it is not necessary to separate the first casing 11 from the second casing 12 entirely. The conditions of the heat dissipation device 1 and the thin pump 13 can be checked after simply opening the cover 15. Therefore, maintenance becomes easier.

The cooling member 14 is disposed in the second accommodating space S2 and has a plurality of spacers 141. The spacers 14 and the thin pump 13 are disposed on the same plane of the first casing 11. In other words, the thin pump 13 and the cooling member 14 are disposed on the same plane of the first casing 11 to thin the whole heat dissipation device. The spacers 141 and one of the first casing 11 and the second casing 12 are integrated as a single member, and they may be one-piece formed. Alternatively, the spacers 141 may be connected to one of the first casing 11 and the second casing 12 by, for example, welding, embedding, adhesion, or the like. Here, that the spacers 141 and the first casing 11 are one-piece formed for example. Moreover, the spacers 141 are in strip shapes, wavy shapes, block shapes, dot shapes, or other shapes, and they may be arranged regularly or irregularly in the second accommodating space S2. Furthermore, the spacers 141 may stand upright, obliquely, or partially upright and partially obliquely. In the embodiment, as shown in the figures, the spacers 141 are in strip shapes parallel arranged side by side on the inner surface of in the first casing 11, and stand upright on the inner surface of the first casing 11. However, in different embodiments, the spacers 141 may also be in different shapes or disposed on the second casing 12, and they are not limited thereto.

The cover 15 according to the embodiment has a fluid inlet I, and the fluid inlet I communicates with the first accommodating space S1. In other embodiments, the cover 15 is not provided with the fluid inlet I, but the first casing 11 or the second casing 12 are still provided with the fluid inlet I, and the disclosure does not limited them. Moreover, the first casing 11 or the second casing 12 has a fluid outlet O. Here, for example, the first casing 11 has a fluid outlet O. The fluid inlet I is the inlet through which the fluid flows into the heat dissipation device 1, and the fluid outlet O is the outlet through which the fluid flows out from the heat dissipation device 1. Moreover, the spacers 141 in the second accommodating space S2 form at least a channel F, and the channel F communicates with the fluid outlet O and the fluid inlet I respectively. As shown in the figure, in the embodiment, the spacers 141 in the second accommodating space S2 form a plurality of channels F (one channel F is formed between two spacers 141) which are parallel to each other (horizontally extended to the left and right sides as shown in FIG. 1C).

Accordingly, after the fluid (with a lower temperature) flows into the heat dissipation device 1 through the fluid inlet I and enters the first accommodating space S1, the thin pump 13 pressurizes the fluid to flow to the second accommodating space S2, and then the fluid (with a higher temperature) flows out through the fluid outlet O after passing through the channels F formed by the spacers 141. Therefore, if a portion of the first casing 11 or the second casing 12 corresponding to the cooling member 14 contacts the heat emitting source, the heat generated by the heat emitting source can be conducted to the spacers 141 of the cooling member 14 from the first casing 11 or the second casing 12, so the fluid that flows in the channels F formed by the spacers 141 takes away the heat generated by the heat emitting source. In addition, the disclosed heat dissipation device 1 is a liquid-cooling heat dissipation device, so it does not have problems of noise and dust occurring in the fan-type heat dissipation device, and heat dissipation is improved in comparison with the air-cooling heat dissipation device.

Figure 2A:
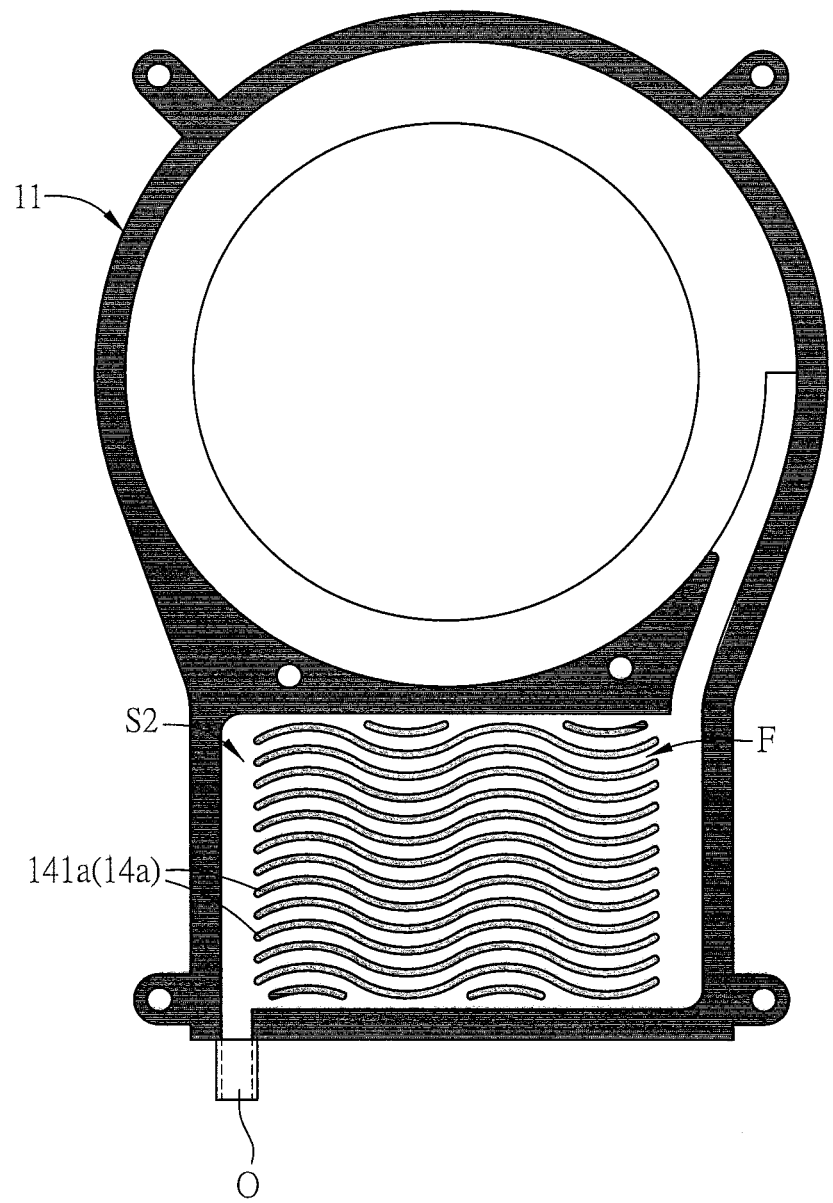
FIG. 2A to FIG. 2C are schematic diagrams respectively showing the arrangements of the first casing and the cooling member of different implementation in the heat dissipation device according to a preferred embodiment.
Figure 2B:
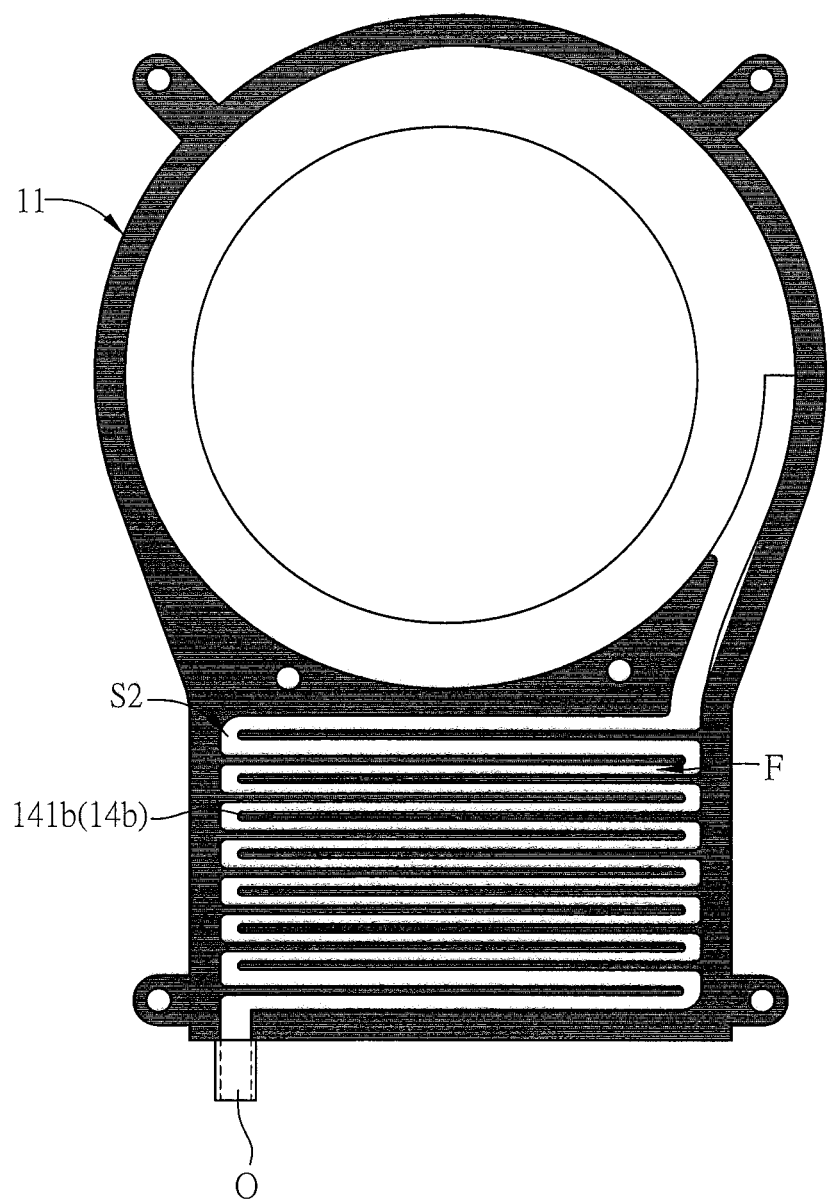
Figure 2C:
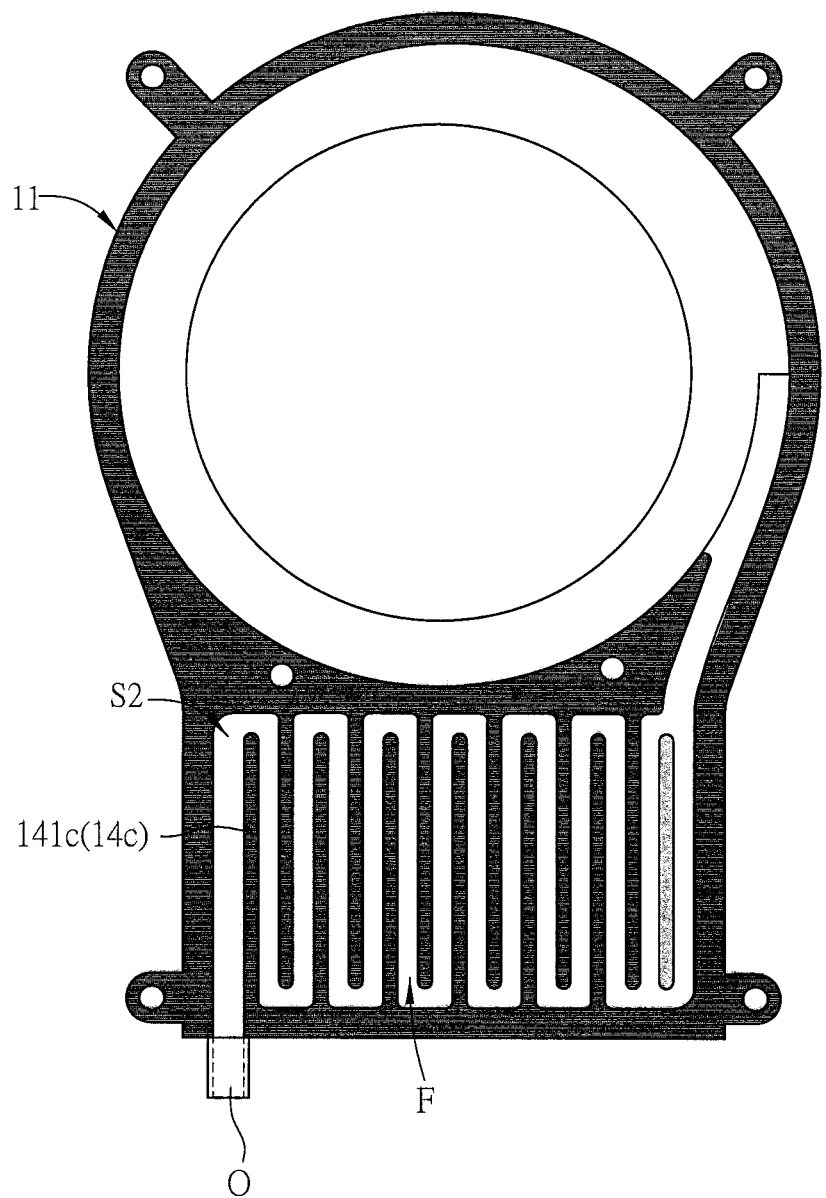

Moreover, referring to FIG. 2A to FIG. 2C, they are schematic diagrams respectively showing the arrangements of the first casing 11 and the cooling members 14a, 14b, 14c of different implementation in the heat dissipation device according to a preferred embodiment.

As shown in FIG. 2A, compared with the cooling member 14 in FIG. 1C, the spacers 141a of the cooling member 14a are wavy, and a plurality of channels F formed in the second accommodating space S2 are wavy (the channels F are still horizontally extended to the left and right sides).

As shown in 2B, compared with the cooling member 14 in FIG. 1C, only one channel F which leads to the fluid outlet O is formed by the spacers 141b of the cooling member 14b in the second accommodating space S2 (the channel F is still horizontally extended to the left and right sides), and the channel F is convoluted (only one inlet and one outlet).

As shown in 2C, compared with the cooling member 14 in FIG. 1C, two channels F are formed at the inlet by the spacers 141c of the cooling member 14c in the second accommodating space S2, but they become one convoluted channel F along the direction toward the fluid outlet O (the channel F is vertically extended to the upper and lower sides).

In addition, a portable electronic device (not shown in figures) is also disclosed. The portable electronic device includes one of the above mentioned heat dissipation devices and varied aspects thereof. The technical features of the heat dissipation devices and the varied aspects may refer to the above description, so they are not repeated here. Moreover, the portable electronic device also includes a body, and the heat dissipation device may contact the body.

Take a laptop or an ultra-light laptop for example. The heat dissipation device of the disclosure may be attached to the casing of the laptop which has the heat emitting source. For example, the portion of the first casing or the second casing of the heat dissipation device corresponding to the cooling member 14 is attached to the bottom of the body with a keyboard system of the laptop, so the fluid which flows in the heat dissipation device can take away the heat generated by the system. Moreover, the heat dissipation device may also be attached to the body of the display screen of the laptop or other heat emitting sources in different positions. Accordingly, the heat dissipation device is arranged flexibly with respect to various heat emitting sources in the portable electronic device, thereby taking away the heat generated by the portable electronic device.

In summary, as to the heat dissipation device and the portable electronic device according to the disclosure, the thin pump and the cooling member are disposed on the same plane of the casing to thin the whole heat dissipation device for application of the portable electronic device. Moreover, the heat dissipation device has a compact volume, and it employs the cooling member disposed on the casing to contact the heat emitting source of the portable electronic device for heat dissipation. Therefore, the heat dissipation device may arranged flexibly for various heat emitting sources in the portable electronic device. Furthermore, the thin pump does not have the problems of noise and dust occurring in the fan-type heat dissipation device, but it has an improved dissipation capability in comparison with the air-cooling heat dissipation device.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A heat dissipation device, comprising:
    a first casing;
    a second casing connected to the first casing to form a first accommodating space and a second accommodating space adjacent to and communicating with the first accommodating space;
    a thin pump disposed in the first accommodating space; and
    a cooling member disposed in the second accommodating space and having a plurality of spacers, wherein the first accommodating space, the second accommodating space, the thin pump and the cooling member are between the first casing and the second casing, the thin pump is connected to the first casing or the second casing, and a side of the thin pump directly faces the first casing,
    wherein the first casing or the second casing has a fluid inlet, and the fluid inlet communicates with the first accommodating space, and
    wherein the first casing or the second casing further has a fluid outlet, at least a channel is formed by the plurality of spacers in the second accommodating space, and the channel communicates with the fluid outlet and the fluid inlet respectively.

2. The heat dissipation device of claim 1, wherein the thickness of the thin pump is between 1 mm and 6 mm.

3. The heat dissipation device of claim 1, wherein the plurality of spacers are parallel arranged side by side on the first casing or the second casing.

4. The heat dissipation device of claim 3, wherein the plurality of spacers and one of the first casing and the second casing are a single member.

5. The heat dissipation device of claim 1, further comprising:
    a cover disposed on a portion of the first casing corresponding to the thin pump.

6. The heat dissipation device of claim 5, wherein the cover has a fluid inlet, and the fluid inlet communicates with the first accommodating space.

7. The heat dissipation device of claim 6, wherein the first casing or the second casing further has a fluid outlet, at least a channel is formed by the plurality of spacers in the second accommodating space, and the channel communicates with the fluid outlet and the fluid inlet respectively.

8. A portable electronic device, comprising:
    a body having a heat emitting source; and
    a heat dissipation device contacting the heat emitting source, wherein the heat dissipation device comprises:
    a first casing;
    a second casing connected to the first casing to form a first accommodating space and a second accommodating space adjacent to and communicating with the first accommodating space;
    a thin pump disposed in the first accommodating space; and
    a cooling member disposed in the second accommodating space and having a plurality of spacers, wherein the first accommodating space, the second accommodating space, the thin pump and the cooling member are between the first casing and the second casing, the thin pump is connected to the first casing or the second casing, and a side of the thin pump directly faces the first casing
    wherein the first casing or the second casing has a fluid inlet, and the fluid inlet communicates with the first accommodating space, and
    wherein the first casing or the second casing further has a fluid outlet, at least a channel is formed by the plurality of spacers in the second accommodating space, and the channel communicates with the fluid outlet and the fluid inlet respectively.

9. The portable electronic device of claim 8, wherein the thickness of the thin pump is between 1 mm and 6 mm.

10. The portable electronic device of claim 8, wherein the plurality of spacers are parallel arranged side by side on the first casing or the second casing.

11. The portable electronic device of claim 10, wherein the plurality of spacers and one of the first casing and the second casing are a single member.

12. The portable electronic device of claim 8, wherein the heat dissipation device further comprises:
   a cover disposed on a portion of the first casing corresponding to the thin pump.

13. The portable electronic device of claim 12, wherein the cover has a fluid inlet, and the fluid inlet communicates with the first accommodating space.

14. The portable electronic device of claim 13, wherein the first casing or the second casing further has a fluid outlet, at least a channel is formed by the plurality of spacers in the second accommodating space, and the channel communicates with the fluid outlet and the fluid inlet respectively.

* * * * *